United States Patent [19]
Mackey et al.

[11] Patent Number: 5,670,180
[45] Date of Patent: Sep. 23, 1997

[54] LAMINATED GLASS AND WINDSHIELD REPAIR DEVICE

[75] Inventors: Randy L. Mackey; Robert A. Beveridge, both of Bend, Oreg.

[73] Assignee: Glas-Weld Systems, Inc., Eugene, Oreg.

[21] Appl. No.: 626,139

[22] Filed: Apr. 5, 1996

[51] Int. Cl.⁶ .................................................. B32B 35/00
[52] U.S. Cl. .................................. 425/11; 425/12; 425/13; 264/36
[58] Field of Search ........................... 425/12, 11, 13; 264/36

[56] References Cited

U.S. PATENT DOCUMENTS

| | | |
|---|---|---|
| 3,562,366 | 2/1971 | Sohl . |
| 3,765,975 | 10/1973 | Hollingsworth . |
| 3,841,932 | 10/1974 | Forler . |
| 3,988,400 | 10/1976 | Luhman . |
| 3,993,520 | 11/1976 | Werner . |
| 4,047,863 | 9/1977 | McCluskey et al. ............ 425/13 |
| 4,132,516 | 1/1979 | Story . |
| 4,200,478 | 4/1980 | Jacino . |
| 4,419,305 | 12/1983 | Matles .................... 264/36 |
| 4,569,808 | 2/1986 | Smali .................... 425/12 |
| 4,597,727 | 7/1986 | Birkhauser . |
| 4,744,841 | 5/1988 | Thomas . |
| 4,775,305 | 10/1988 | Alexander . |
| 4,814,185 | 3/1989 | Jones . |
| 4,820,148 | 4/1989 | Anderson . |
| 4,921,411 | 5/1990 | Ottenheimer . |
| 5,028,223 | 7/1991 | Ameter . |
| 5,104,304 | 4/1992 | Dotson . |
| 5,116,441 | 5/1992 | Campfield . |
| 5,122,042 | 6/1992 | Einiger . |
| 5,156,853 | 10/1992 | Werner . |
| 5,429,692 | 7/1995 | Campfield . |

*Primary Examiner*—Jay H. Woo
*Assistant Examiner*—Minh-Chau T. Pham
*Attorney, Agent, or Firm*—Robert L. Harrington

[57] ABSTRACT

A convertible repair device arranged to repair bulls-eye type cracks and elongate cracks in a laminated glass. The device has a stepped housing that has a large cylinder and a small cylinder. A piston is mounted in the housing and is movable in the cylinders. A mouth formed in the small cylinder is arranged to receive the filler material. The device is arranged to withdraw air from the bulls-eye type crack by moving the piston upward. When the air is withdrawn the piston is moved downward and the filler material flows into the crack. The piston has a thread form on its upper portion and a plunger projected into the thread form provides controlled movement of the piston without imparting a force on the surface of the laminated glass which is beneficial for filling elongate cracks.

4 Claims, 3 Drawing Sheets

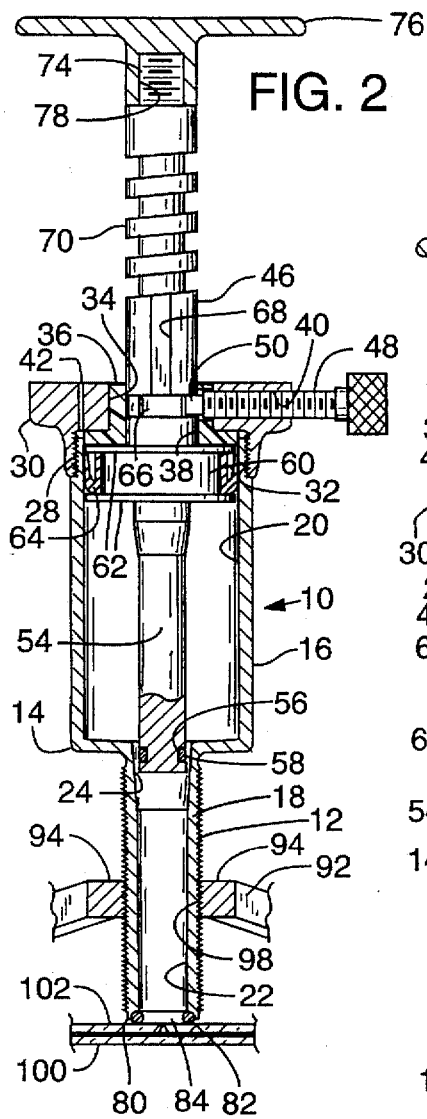
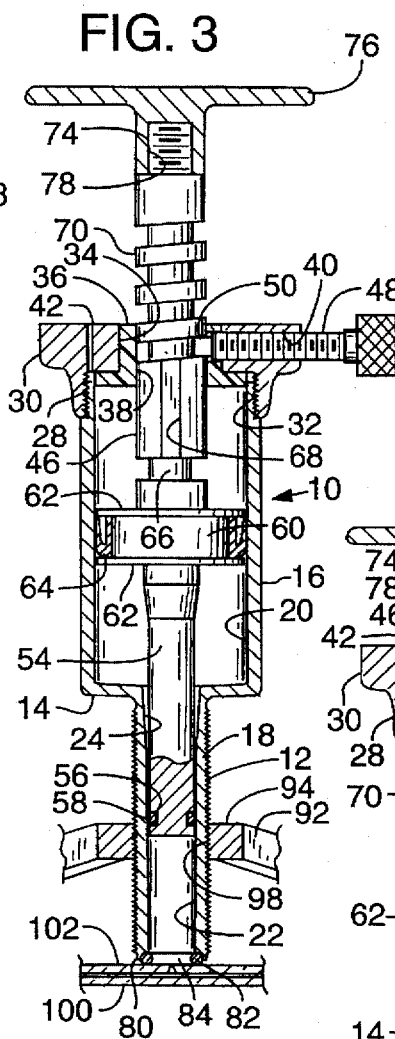
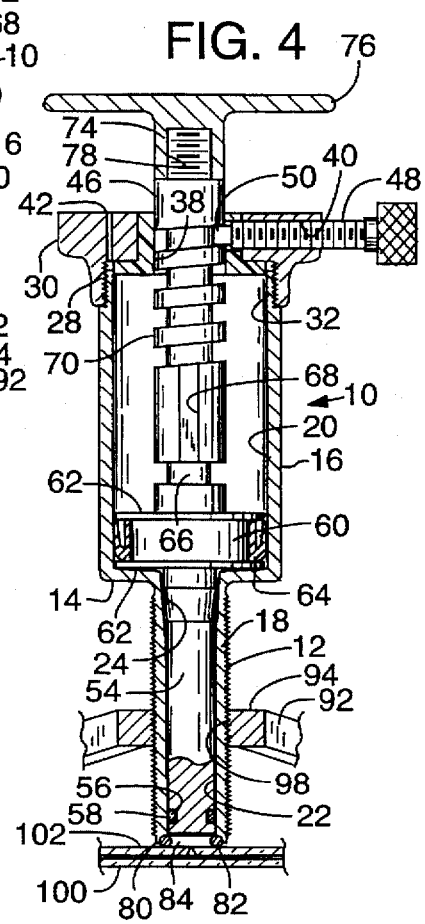

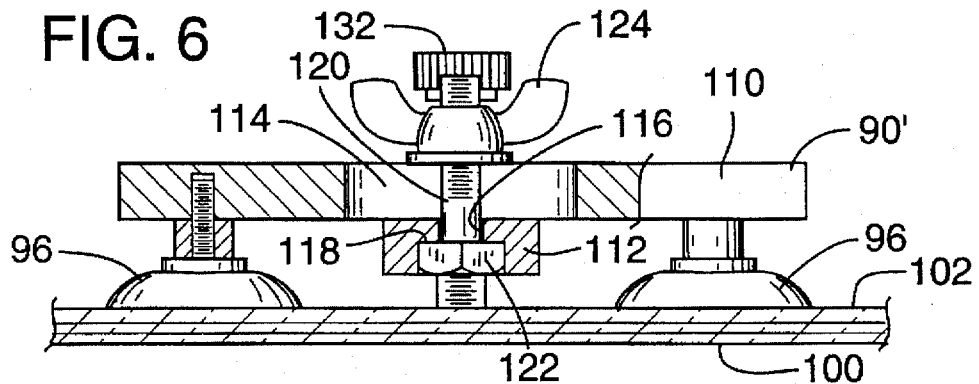
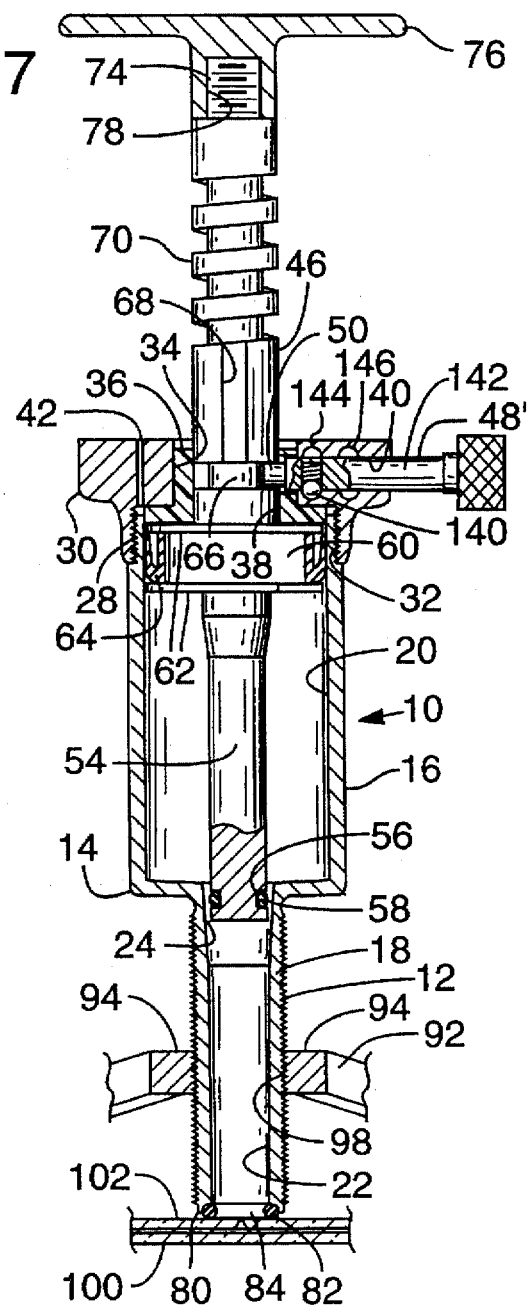

LAMINATED GLASS AND WINDSHIELD REPAIR DEVICE

FIELD OF THE INVENTION

This invention relates to a repair device for laminated glass which optimally converts between different repair features for repairing both bulls-eye or star type cracks and long cracks.

BACKGROUND OF THE INVENTION

Laminated glass is commonly constructed of two glass layers and an intermediate layer of a tough plastic material. Vehicle windshields are of this type of construction and are probably the most commonly known. Hereafter the laminated glass may be referred to as a windshield, however the reference will also apply to any type of glass having the laminated construction.

As previously mentioned, laminated glass such as a windshield for a vehicle is commonly constructed of two glass layers and an intermediate layer of tough plastic. The outer layer of glass is often pelted by objects such as stones that may be severe enough to crack the outer glass layer. A star or bulls-eye crack will have a small exterior hole or opening that expands under the exterior surface as a cone (bulls-eye type crack) or short radial cracks (star type crack). Alternately, the crack may simply be a long crack that is open to the exterior along a major portion or all of its length and extend well beyond six inches in length.

A predecessor to the present invention was developed by Alexander, et al and disclosed in U.S. Pat. No. 4,774,305. The entire disclosure of this Alexander patent is incorporated herein by reference.

The device of the Alexander invention proved very effective for fixing the star or bulls-eye cracks. A problem addressed by the Alexander device was the withdrawal of air contained in the cracks so as to avoid the formation of air pockets during repair. A dispensing mouth forming an inlet/outlet to a dispensing/vacuum chamber is placed over the opening and a piston is retracted to draw a vacuum in the vacuum chamber of the device. Air is thereby drawn through the mouth out of the crack and release of the piston dispenses liquid filler into the evacuated crack.

Whereas the Alexander device can be used to dispense liquid filler into a long crack, the vacuum feature serves no purpose where the crack opening extends beyond the width of the mouth (and thus is unable to draw a vacuum). In the instance of a long crack, the device is simply moved along the length of the crack dispensing liquid filler in an even flow into the crack by depressing the piston.

BRIEF DESCRIPTION OF THE INVENTION

Whereas the piston of the Alexander device being under vacuum is pulled into the device following release when repairing the star or bulls-eye cracks, without the vacuum (as when repairing a long crack) the operator applies pressure to the piston to dispense the liquid filler. Such applied pressure of the device against the glass may cause the crack to close and make injection of the liquid filler more difficult. Also, there is the control problem. It is desirable to dispense the liquid in an even flow into the crack as the mouth of the device is moved along the crack and having to apply pressure while moving the device makes it difficult for the operator to control the flow of liquid filler.

The present invention is directed to the provision of a screw mechanism for the piston of the device. Preferably a lock screw provided in the Alexander device is modified to perform dual functions, i.e., it performs the original locking function so as to hold a vacuum in the vacuum chamber (when repairing a star or bulls-eye crack) and it also selectively provides a component of the screw mechanism. Preferably the piston is provided with a groove including a combination of a lower circular groove and a spiral, screw type groove with a connecting slot or groove between them.

When repairing a star type crack, the device is operated as before with a plunger which functions as a lock screw retracted to allow the linear withdrawal of the piston followed by insertion of the screw at the fully withdrawn position of the piston to thereby lock the piston and hold the vacuum for extraction of air from the crack. When repairing a long crack and no vacuum is involved, the piston is fully extracted and the plunger inserted into the holding groove. By rotating the piston, the screw will first become aligned with the connecting slot and then move into the spiral groove for inwardly feeding the piston down through the chamber to controllably dispense the liquid filler into the crack.

The invention will be more fully understood upon reference to the following detailed description and the drawings referred to therein.

BRIEF DESCRIPTION OF THE DRAWINGS

FIGS. 2, 3 and 4 are sectional views of the convertible laminated glass repair device of FIG. 1;

FIGS. 5 and 6 are views of the convertible laminated glass repair device of FIG. 1 having an alternate holder arrangement; and, FIG. 7 is a sectional view of the convertible laminated glass repair device of FIG. 1 illustrating an alternate detent plunger.

DESCRIPTION OF THE PREFERRED EMBODIMENT

The convertible laminated glass repair device of the present invention is suited for repairing all types of cracks that may exist in laminated glass such as a windshield of a vehicle. The laminated glass (windshield) referred to is of conventional design having two outer layers of glass and a center layer of high strength plastic material.

Generally the laminated glass will be damaged by two types of cracks. One type of crack is a star or bulls-eye (sub-surface) crack which will have a small exterior hole or opening that expands under the surface of one of the glass layers. The repair of this type of crack is accomplished by applying a vacuum to the crack to withdraw all of the air out of the crack and then injecting a suitable resin that has the same index of refraction as the glass. The other type of crack is a surface crack that extends for a length along one of the glass layers of the laminated glass. All of the crack or substantially all of the crack is exposed to the air and it is not feasible to withdraw the air out of the crack. The long crack is repaired by first using known crack expanders to expand the crack slightly and then applying a controlled flow of resin material into the crack along its full length. The convertible laminated glass repair device of the present invention is suited for repairing both types of cracks that occur in the laminated glass.

Figure 1:
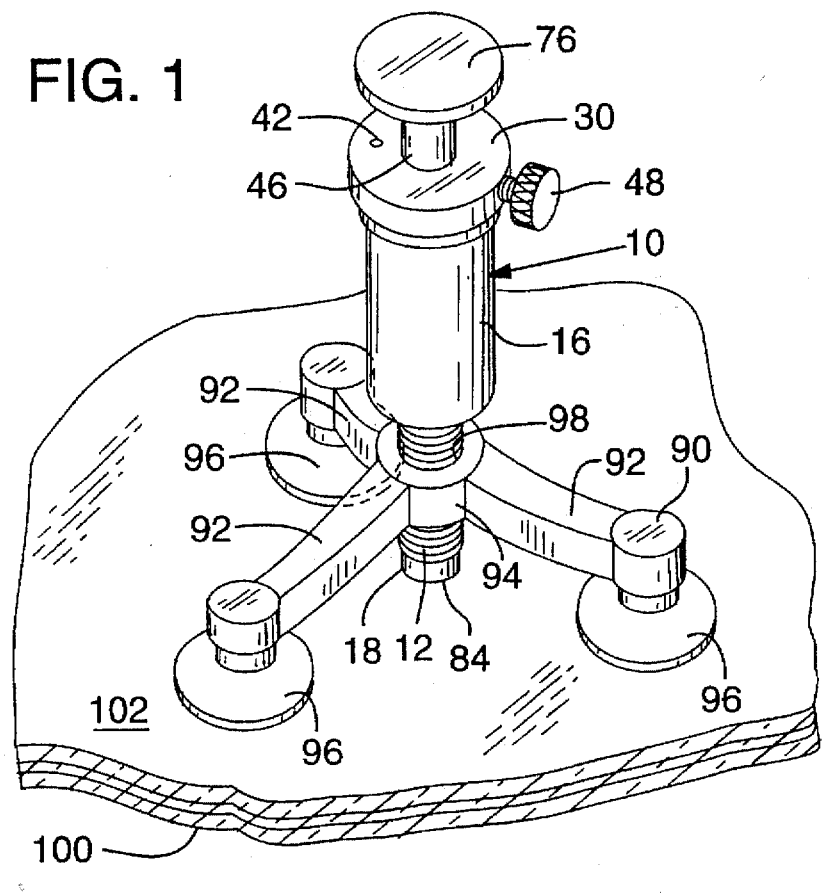
FIG. 1 is a perspective view of a convertible laminated glass repair device of the present invention mounted in a holder and positioned strategic to the laminated glass.

Referring now to FIG. 1, a convertible laminated glass repair device 10 which hereafter will be referred to as a device 10 is illustrated mounted in a holder 90. In this embodiment, the holder 90 is of a tripod-type having legs 92 that extend from a hub 94. Suction cups 96 are provided on the ends of the legs 92 and are arranged to grip the surface 102 of the laminated glass 100. The hub 94 has a threaded bore 98 that will receive a threaded end 12 of the device 10. The device 10 thus may be adjustably mounted in the holder 90 by simply rotating the device 10 to either advance the device 10 toward the surface 102 of the laminated glass 100 or to retract the device 10 away from the surface 102 of the laminated glass 100.

Figure 5:
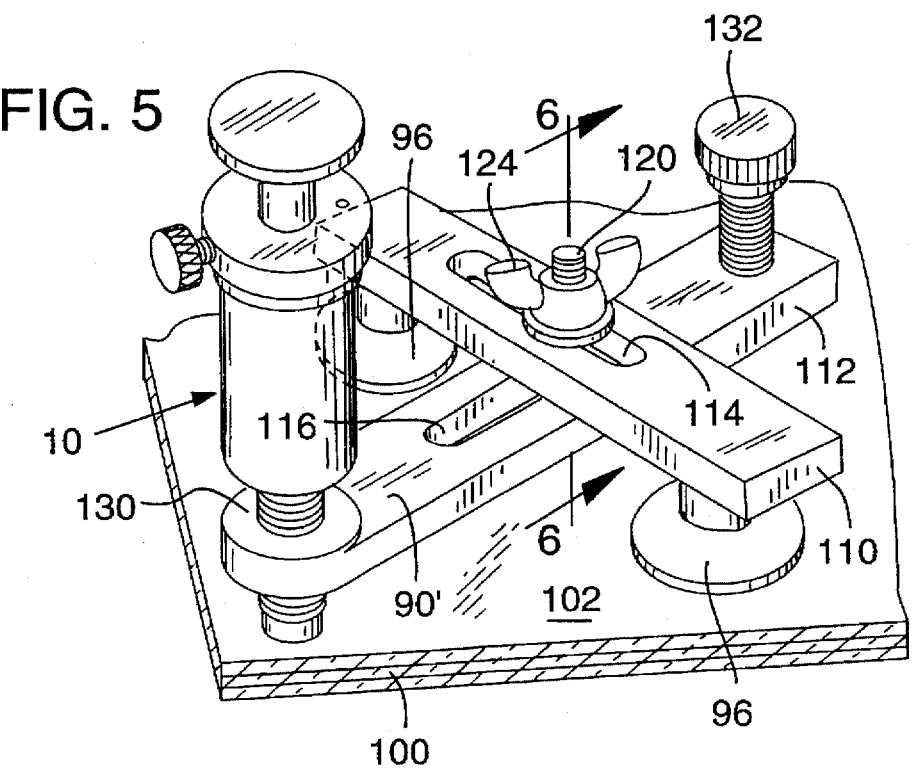

An alternate holder 90' is illustrated in FIG. 5. The holder 90' has two cross bars 110 and 112. The cross bar 110 has a slot 114 and the cross bar 112 has a slot 116. The slots 114, 116 extend longitudinally in their corresponding bars 110, 112. The slot 116 in the bar 112 preferably has a formed shoulder 118 (FIG. 6) to receive the head 122 of a fastener such as a bolt 120. The bars 110 and 112 are joined together by the bolt 120 and the bolt is secured in position by a threaded fastener, such as wing nut 124. The bars 110 and 112 may be pivoted relative to each other about the axis of the bolt 120 and may be moved longitudinally with the bolt 120 traversing the slots 114 and 116. The bars 110 and 112 thus may be adjusted to infinite positions relative to each other. The bolt 120 and the wing nut 124 will secure the bars 110 and 112 in their adjusted position. The bar 112 has a threaded bore 130 for mounting the repair device 10. The opposite end of the bar 112 is bored to receive an adjusting screw 132. Suction cups 96 are fitted to the bar 110 as shown in the figure.

The holder 90' is secured to the surface 102 of the laminated glass 100 by the suction cups 96. The device 10 is installed in the bore 130 of the bar 112 and is advanced to the surface 102. The adjusting screw 132 is utilized to pivot the holder 90' on the suction cups 96 to accurately align the device 10 normal to the surface 102. Additionally the screw 132 is utilized to apply the desired pressure of the device 10 acting on the surface 102. The full range of adjustability of the holder 90' is particularly suited for filling cracks that are close to an edge of the laminated glass 100 and for filling cracks that may occur along a curvature of the glass 100, such as experienced in windshields.

The convertible laminated glass repair device 10 is further illustrated in the sectional views of FIGS. 2, 3 and 4. The device 10 has a housing 14 in the form of a stepped cylinder. The housing 14 has a large upper cylinder 16 and a smaller diameter cylinder 18 extending from the larger diameter cylinder 16. As previously mentioned, the small diameter cylinder 18 has external threads 12 to facilitate mounting the housing 14 in a holder. The lower end of the small diameter cylinder 18 has a groove 80 that is arranged to receive an o-ring 82. The o-ring 82 surrounds an entry or a mouth 84 of the cylinder 18 and thus the housing 14.

The larger diameter 16 has an internal bore 20 that is coaxial with a bore 22 of the small diameter cylinder 18. The bore 22 of the cylinder 18 has a tapered portion 24 commencing from the end of the large cylinder 16 and continuing on down to a straight portion of the bore 22. The upper end of the cylinder 16 has threads 28 to facilitate mounting a cap 30. The cap 30 has internal threads 32 that will mate with the threads 28 of the cylinder 16 and thus the cap 30 may be threadably installed on the cylinder 16. The cap 30 has a central bore 34 arranged to receive a bushing 36. The bushing 36 fits in the bore 34 and has a central bore 38 that is sized to receive a piston 46. A cross bore 40 is provided in the cap 30 and is threaded to receive a threader plunger 48. The bore 40 extends into the bore 34 of the cap 30 and the bushing 36 has a bore that will be aligned with the bore 40 when the bushing is installed in the cap 30. A vent hole 42 is provided in the cap 30 for venting the upper end of the cylinder 16 to the atmosphere.

The plunger 48 having a formed end 50 is sized to be received in the threaded bore 40 and is arranged so that the formed end 50 is engageable with the piston 46 when the threaded plunger 48 is installed and advanced in the bore 40.

The piston 48 may have alternate forms. An example of one form is illustrated in FIG. 7. The piston 48' is provided with a spring biased ball 140 in its stem portion 142 in a conventional manner. Grooves 144 and 146 are provided in the bore 40 of the cap 30 to receive the projection of the ball 140 to retain the plunger 48' in position. The groove 144 will maintain the piston 48' in engagement with the piston 46 and the other groove 146 will maintain the piston 48' out of engagement with the piston 46. Other types of plungers may be utilized as well that become engaged and disengaged with the piston 46.

The piston 46 is installed in the housing 14 as shown in FIGS. 2, 3 and 4. The piston 46 is adjustably movable in the housing 14 from an upper position as shown in FIG. 2 to a lower position as illustrated in FIG. 4.

A portion 54 of the piston 46 is sized to fit in the bore 22 of the cylinder 18. A groove 56 is formed in the end of the portion 54 to receive an o-ring 58. The piston 46 has a circular portion 60 positioned adjacent the lower portion 54 of the piston 46. The circular portion 60 has extending flanges 62 that are arranged to receive a cup seal 64. The cup seal 64 is sized to engage the bore 20 of the cylinder 16. A circular groove 66 is formed in the piston 46 above the circular portion 60 and is sized to receive the end 50 of the plunger 48. A longitudinal slot 68 in the piston 46 extends from the circular groove 66 to a thread form 70 (helical groove).

The thread form 70 in this embodiment is a square-type such as Acme threads. The profile of the circular groove 66, the longitudinal slot 68 and the thread form 70 are essentially the same, that is, the depth and width of the groove 66, the slot 68 and thread form 70 are of the same dimension to insure a smooth transition of the formed end 50 through the slot, thread form and groove.

The upper end 74 of the piston 46 is threaded to receive a handle 76. The handle 76 has a threaded internal bore 78 that mates with the threaded end 74.

As previously mentioned, the piston 46 of the device 10 is movable in the housing 18 as illustrated in FIGS. 2, 3 and 4. FIG. 2 illustrates the piston 46 retracted upwardly to its upper limit. As shown, the cup seal 64 mounted on the circular portion 60 has been moved upwardly in close proximity to the bushing 36. The lower portion 54 has been retracted upwardly in the bore 22 and as shown the lower end of the portion 54 has been retracted into the tapered portion 24 of the bore 22. The plunger 48 has been advanced so that the end 50 engages the circular groove 66 and thus will lock the piston 46 in the uppermost position.

FIGS. 3 and 4 illustrates the plunger 48 engaging the threaded portion 70 of the piston 46. With the plunger 48 engaging the thread form 70, the piston 46 may be advanced downwardly or upwardly in a controlled manner by utilizing the thread form 70. An additional advantage to the thread form being utilized is that the housing 14 is neither forced upwardly or downwardly as the piston 46 is advanced or retracted.

The plunger 48 may also be retracted so that it does not engage the thread form 70, the circular groove 66 or the longitudinal slot 68. The retraction of the plunger 48 permits manual positioning of the piston 46 in the housing 14 by simply grasping the handle 76 and forcing the piston 46 either downwardly or upwardly relative to the housing 14.

The housing 14 in effect defines two separate chambers (cylinders 16 and 18) which operate independently and concurrently to either withdraw or introduce air through the mouth 84 of the device 10.

Referring now to FIGS. 1 and 4, consider first a star or bulls-eye type crack that has a small exterior hole or opening in the outer layer of the laminated glass. The holder 90 is positioned over the crack such that the center of the hub 94 is positioned over the hole of the bulls-eye type crack. The holder 90 is secured in position by the suction cups 96. The device 10 is inverted so that a quantity of the fill material (resin) may be placed in the mouth 84. The device 10 is installed in the holder 90 such as illustrated in FIG. 1 with the mouth 84 of the device 10 positioned over the opening or hole in the bulls-eye type crack. The housing 14 is rotated in the threaded hub 94 until the o-ring 82 engages and seals the surface 102 of the laminated glass 100 surrounding the opening in the crack.

With a bulls-eye type crack, the device 10 may be utilized in one of two ways. In the first arrangement, the plunger 48 is retracted so that it does not engage the piston 46, either the periphery of the piston or one of the circular groove 66 or the horizontal slot 68 or the thread form 70. When it is desired to withdraw air from the crack in the laminated glass, the piston 46 is simply moved upwardly.

Initially the lower chamber defined by the lower cylinder 18 will withdraw air from the crack in the laminated glass since the o-ring 58 seals the lower bore 22. As the piston 46 is moved upwardly, a vacuum will be created in the large cylinder 16 and the small cylinder 18 by the piston 46 moving upwardly. As the piston moves upwardly and the o-ring 58 enters into the tapered portion 24 of the cylinder 18, the sealing effect of the o-ring 58 will be lost and the vacuum formed in the upper chamber 16 by the seal 64 will in effect provide an additional drawing force to remove air from the crack in the laminated glass 100. As the air is withdrawn from the crack the air will flow through the resin located in the mouth 84 of the device 10. The piston 46 is then allowed to descend and the resin will flow into the crack. The vacuum in the upper cylinder 16 (and lower cylinder 18 and in the crack) will urge the piston 46 downward and if needed the piston 46 may be urged downward by applying pressure on the handle 76. Should an air bubble still remain in the crack the procedure is repeated until all of the air has been removed from the crack and the crack is filled with the resin material.

The resin material is cured and hardened by exposing the resin to ultra-violet light.

Often it is desired to move the piston 46 upwardly and hold it in position to hold a vacuum on the crack in the laminated glass 100 for a sustained period of time. The air in the crack will be gradually depleted with the sustained vacuum. To perform this type of operation, the piston 46 is moved upwardly to its fully retracted position and the plunger 48 (which is aligned with slot 66 in its fully retracted position) is screwed inwardly to engage the slot 66 to thus lock the piston 46 in the up position such as illustrated in FIG. 2. Following evacuation of the air, the plunger 48 is withdrawn and the vacuum in the cylinder will pull the piston toward the cylinder mouth for dispensing of the resin.

There are occasions when due to the position of the crack or the curvature on the laminated glass (such as on a windshield) it may be desired to have a finely controlled rate of withdrawal of the piston 46. The plunger 48 is advanced to engage the circular groove 66. The piston is rotated so that the plunger 48 is aligned with the longitudinal slot 68. The piston 46 is retracted until the plunger is in the thread form 70. The piston 46 is then simply rotated by the handle 76 to finely control the advance of the piston 46 upwardly due to the interaction of the plunger 48 and the thread form 70 to thus draw a vacuum in the upper and lower chambers. Similarly, the piston may be finely controlled to move the piston 46 downwardly.

Long cracks in the surface 102 of the laminated glass 100 are filled with a resin material by the device 10, however, generally a vacuum is not drawn since a long crack is generally open to the atmosphere along its length. Most often a long crack needs to be expanded to allow the resin material to flow readily into the crack. Known crack expanders are positioned on the opposite side of the laminated glass whereat the crack occurs and pressure is applied to open the crack a small finite amount. Crack expanders are known in the industry and, therefore, are not detailed but are mentioned since generally this is the procedure utilized to facilitate injecting the resin material into the long open crack to facilitate a repair.

Resin material is placed in the mouth 84 of the device 10 in the same manner as before. A holder 90 such as illustrated in FIG. 1 or an alternate holder 90' as illustrated in FIGS. 5 and 6 is utilized along with the device 10 to fill a long crack.

The suction cups 96 are lubricated so that the holder 90 (90') may be moved along the crack in the surface 102 of the laminated glass 100. The cups 96 even though lubricated will maintain their retentive power but allows sliding movement of the holder 90 (90') along the surface 102 of the laminated glass 100. Resin material is placed in the mouth 84 of the device 10 and the device 10 is mounted in the holder 90 (90'). The device 10 is advanced down so that the o-ring 82 engages the surface 102 of the laminated glass 100. When utilizing the holder 90', the adjusting screw is utilized to accurately align the device 10 normal to the surface 102 and additionally the screw is adjusted to apply the desired force between the device 10 and the surface 102 of the glass 100. Since a vacuum in most cases cannot be drawn on a long crack, the piston 46 is elevated to a position such as illustrated in FIG. 2 and the plunger 48 engaged with the circular groove 66. The piston is turned with slight pressure applied until end 50 of the plunger aligns with groove or slot 68 whereupon the piston will move down to where the plunger is seated in thread form 70.

The handle 76 is rotated to advance the piston downward to force the resin into the crack. The device 10 mounted in one the holders is moved along the crack and as the device 10 is moved, the handle is rotated to provide an even uniform flow of the resin into the crack. The piston 46 as it is moved downward will compress the air above the resin material in the mouth 84 to force the resin to flow into the long crack. The o-ring 58 will seal the bore 22 and thus as the piston 46 is moved downward the air will be compressed to force the resin into the crack. A user may thus accurately control the flow of the resin material into the crack as the device is moved along the crack. By utilizing the capability of controllably advancing the piston 46 by rotating the piston a force is not applied against the surface 102 of the laminated glass 100 as would be experienced by simply forcing the piston downward by applying a force to the handle 76.

The cup seal 64 fitted to the piston 46 will as the air is compressed in the large cylinder 16 simply fold away from the wall of the bore 20 due to its inherent design to permit air to flow past the cup seal 64.

Those skilled in the art will recognize that modifications and variations may be made without departing from the true spirit and scope of the invention. The invention is therefore not to be limited to the embodiments described and illustrated, but is to be determined from the appended claims.

What is claimed is:

1. A device for repairing cracks in laminated glass having convertibility between repairing sub-surface and surface cracks comprising:

a cylinder defining a dispensing mouth at an inner end, a cavity and an opening at an outer end defining a central bore;

a piston mounted for axial movement in the cavity of the cylinder including a seal portion forming a seal in the cavity and enabling the production of a vacuum when drawn outwardly through the cavity, a shaft portion extended through and fixed to the seal portion and movable toward the mouth, said shaft portion having a handle portion extended through the central bore and out of the cylinder opposite the mouth and exposed for manual manipulation;

a mounting member attachable to the cylinder and piston combination for mounting the cylinder and piston combination to a laminated glass for positioning the mouth of the cylinder proximal to a crack in the laminated glass; and said shaft portion including a helical groove, said shaft portion extended through the central bore of the cylinder, said central bore sized to receive the shaft portion including the helical groove to permit free sliding linear movement of the shaft portion through the central bore, and a plunger member carried by the cylinder and selectively laterally projectable into and out of engagement with the helical groove of the shaft member whereby upon being projected into the groove, turning of the exposed handle portion forces movement of the shaft portion toward and away from the mouth of the cylinder and upon withdrawal of the plunger member said handle can be linearly slidably forced toward and away from the mouth of the cylinder.

2. A device as defined in claim 1 wherein the plunger member is inserted through a wall of the cylinder for engagement and disengagement with the helical groove.

3. A device as defined in claim 2 wherein a circular groove is formed on the shaft inwardly of the helical groove, and a connecting groove connecting the circular groove and helical groove, said circular groove receiving the plunger member with the shaft fully withdrawn for holding the shaft in the fully withdrawn position, and said connecting groove receiving the plunger member upon turning of the handle for guiding the piston member from the circular groove through the connecting groove and into the helical groove.

4. A device as defined in claim 3, wherein the plunger member is threaded and said piston member is threadably inserted through a wall of the cylinder for engagement and disengagement with the helical groove.

* * * * *

UNITED STATES PATENT AND TRADEMARK OFFICE
CERTIFICATE OF CORRECTION

PATENT NO. : 5,670,180
DATED : 9/23/97
INVENTOR(S) : Mackey, Beveridge

It is certified that error appears in the above-identified patent and that said Letters Patent is hereby corrected as shown below:

Col. 8, lines 25 and 28, change "piston" to --plunger--.

Signed and Sealed this

Ninth Day of December, 1997

Attest:

BRUCE LEHMAN

Attesting Officer

Commissioner of Patents and Trademarks